United States Patent [19]

Tomlinson

[11] 4,128,930
[45] * Dec. 12, 1978

[54] PLUMBING TOOL WITH EXTERNAL SHACKLE

[76] Inventor: Thomas A. Tomlinson, 348 Manor Rd. East, Toronto 298, Ontario, Canada

[*] Notice: The portion of the term of this patent subsequent to Feb. 12, 1992, has been disclaimed.

[21] Appl. No.: 417,131

[22] Filed: Nov. 19, 1973

Related U.S. Application Data

[62] Division of Ser. No. 270,534, Jul. 10, 1972, abandoned.

[30] Foreign Application Priority Data

Mar. 10, 1972 [CA] Canada .................................. 136771

[51] Int. Cl.² ........................... B23p 19/04; F16l 55/18
[52] U.S. Cl. ............................... 29/213 R; 29/401 C
[58] Field of Search .......................... 29/213, 237, 401; 138/89, 90, 97

[56] References Cited

U.S. PATENT DOCUMENTS

| 2,141,274 | 12/1938 | Lenhart | 29/213 |
| 2,621,679 | 12/1952 | Tuttle | 138/90 |
| 2,690,612 | 10/1954 | Scott | 29/213 |
| 3,644,982 | 2/1972 | Anderson | 29/213 |

Primary Examiner—Al Lawrence Smith
Assistant Examiner—J. C. Peters

[57] ABSTRACT

A plumbing device includes a radially outwardly and resiliently expansible sealing plug carried on the front end of an elongated axial shaft. An elongated cylinder disposed about the shaft transmits axial movement to the plug from a jack mechanism near the rear end of the shaft so as to cause expansion of the plug into sealing engagement with the inner surface of a pipe in which it is positioned. An external shackle is clamped about the pipe and carries a pair of elongated threaded rods which extend rearwardly beyond the jack mechanism so that a rear lock gate plate can be placed over the axial shaft and secured on each of the threaded rods so as to abut the jack mechanism and so prevent rearward axial displacement of the plug within the pipe under the action of fluid pressure therein. An externally threaded sleeve is freely disposed about the elongated cylinder so that an internally threaded split bushing can be placed about that sleeve and engaged by a front lock gate plate which can also be secured on the threaded rods extending from the pipe-clamping shackle. By alternating the clamping function between the front and rear lock gate plates, it is possible to move a pipe fitting along the device and consequently to remove such a fitting from the end of the pipe and/or to secure a new or replacement fitting on that pipe end.

25 Claims, 17 Drawing Figures

PLUMBING TOOL WITH EXTERNAL SHACKLE

CROSS REFERENCE TO RELATED APPLICATION

This is a divisional application of U.S. Pat. application Ser. No. 270,534, filed July 10, 1972, entitled "PLUMBING TOOL WITH EXTERNAL SHACKLE," and now abandoned.

BACKGROUND OF THE INVENTION

The present invention relates to a plumbing device and more particularly to a plumbing device including a radially outwardly resiliently expansible plug or sleeve which can be expanded into sealing engagement with the inner surface of a pipe in which it is disposed.

Several pipe-plugging devices have heretofore been proposed but many such known devices have relied on the frictional sealing engagement between an expansible sleeve and the inner surface of a pipe to prevent displacement of such a device from a pipe within which it is disposed. One such device is described in Austrian Pat. No. 98,176 while another is described in U.S. Pat. No. 2,322,842.

Although such known pipe-plugging devices are very useful where it is desired to prevent the flow of liquid from the end of a pipe, they are obviously limited in their use to conditions under which the fluid pressure to which they are subject is insufficient to cause axial slipping of the expanded plug in the pipe.

It has also heretofore been suggested to provide a pipe-plugging device which incorporates an external pipe clamp to reduce the risk of slipping of the expanded plug under fluid pressure. One such device is described in U.S. Pat. specification No. 3,326,243. The device described in that particular specification does not, however, permit access to the end of the pipe while the plug is secured therein.

Frequently, it is desired temporarily to plug a pipe against the flow of fluid while a plumbing element, such as a valve, is secured to the end of the pipe or while a faulty plumbing element, such as a leaking valve, is removed from the pipe end and replaced by a new one.

It is a principal object of this invention to provide a plumbing tool or device including a radially outwardly resiliently expansible sealing plug or sleeve which can be expanded within a pipe into sealing engagement with the inner surface of the pipe and which device provides coupling of the expanded sleeve to an external pipe-clamping shackle so as to prevent slippage of the sleeve within the pipe under the action of fluid pressure, while still permitting working access to the end of the pipe.

Another object of this invention is to provide a plumbing device for the aforesaid purpose and which device has a relatively simple construction and is very easy to use.

A further object of the invention is to provide a plumbing device of the aforementioned type and which is capable of being used on a pipe carrying a fluid at a relatively high pressure without danger of slipping of the pipe-sealing plug.

Another object of this invention is to provide a method and device whereby the sealing plug of a device of the aforesaid type can be introduced into a pipe against fluid pressure therein.

One further object of this invention in accordance with a preferred feature thereof is to provide a device of the aforementioned type and by means of which an expansible sealing plug can be inserted into a pipe against fluid pressure therein with reduced stress on the pipe and its mountings.

Other objects of the invention will become apparent as the description herein proceeds.

SUMMARY OF THE INVENTION

The present invention is based on the application to the design of a plumbing device for the aforementioned purpose of the principle of lock gates as used in canals, air-locks and the like.

The device of this invention involves the provision of an external pipe-clamping shackle which can be coupled to an internal expansible pipe-sealing plug through either of two lock gate members. By alternating the coupling function between two axially separated lock gate members, it is possible to remove a plumbing element from the end of the pipe section or to position such a plumbing element on such a pipe section and without risk of slippage of the pipe-sealing plug within the pipe.

A plumbing device in accordance with this invention can broadly be defined as comprising: an elongated axial shaft having front and rear ends; a radially outwardly resiliently expansible and axially resiliently compressible sealing sleeve disposed about the shaft in proximity to the front end thereof, the sealing sleeve being intended to be disposed within a pipe for sealing engagement with an inner surface of such a pipe; a sleeve-abutment member on the axial shaft for axial abutment by the sealing sleeve forwardly thereof; a jack mechanism on the axial shaft toward the rear end thereof; an elongated member extending between the sealing sleeve and the jack mechanism and adapted to transmit axial movement from the jack mechanism to the sealing sleeve to cause axial compression and consequently radially outward expansion of the sealing sleeve; a pipe-clamping shackle for clamping engagement with an outer surface of the pipe; a holding means extending rearwardly from the pipe-clamping shackle; a front lock gate member couplable to the holding means and to the sealing sleeve and adapted releasably to maintain the sealing sleeve in a desired axial position within the pipe when so coupled to the sealing sleeve and to the holding means and when the shackle is secured in clamping engagement with the pipe; and a rear lock gate member couplable to the holding means and to the sealing means and adapted releasably to maintain the sealing sleeve in a desired axial position within the pipe when so coupled to the sealing sleeve and to the holding means and when the shackle is secured in clamping engagement with the pipe, whereby the sealing sleeve can be held in such a desired axial position within the pipe by either of the front and rear lock gate members thereby to permit both the removal from and the fitting to the end of the pipe of a plumbing element without risk of axial movement of the sealing sleeve.

Other features of the invention and the advantages resulting therefrom will become apparent as the description herein proceeds.

BRIEF DESCRIPTION OF THE DRAWINGS

The invention will now be described by way of illustration with reference to the accompanying drawings in which:

FIG. 1 is a horizontal axial sectional view through one embodiment of a plumbing tool or device in accordance with this invention and showing that device in use on a pipe for the purpose of enabling a leaking gate valve to be removed therefrom and replaced by a new one, the rearward portion of the device being shown in FIG. 1A and the forward portion being shown in FIG. 1B;

FIG. 2 is an elevational view of a pipe with a faulty gate valve fitted thereon and with a section of the pipe shown fragmentarily and in phantom outline;

FIG. 9 is a front elevation of a front lock gate plate forming part of the device shown in the preceding figures;

FIG 10 is a vertical transverse section through the front lock gate plate shown in FIG. 9 when taken as indicated by the arrows 10—10 of that figure;

FIG. 11 is a front elevation of a rear lock gate plate forming part of the device shown in FIGS. 1 to 8;

FIG. 12 is a vertical transverse section through the rear lock gate plate of FIG. 11 when taken as indicated by the arrows 12—12 of that figure;

FIG. 13 is a fragmentary perspective view on an enlarged scale showing one of two swivel mechanisms provided in the device shown in FIGS. 1 to 8;

FIG. 16 is a perspective view on an enlarged scale of a sealing sleeve-advancing drive wheel forming part of the device shown in FIGS. 1 to 8.

DESCRPTION OF THE PREFERRED EMBODIMENT

Figures 1A, 9, 10, 11, 12:
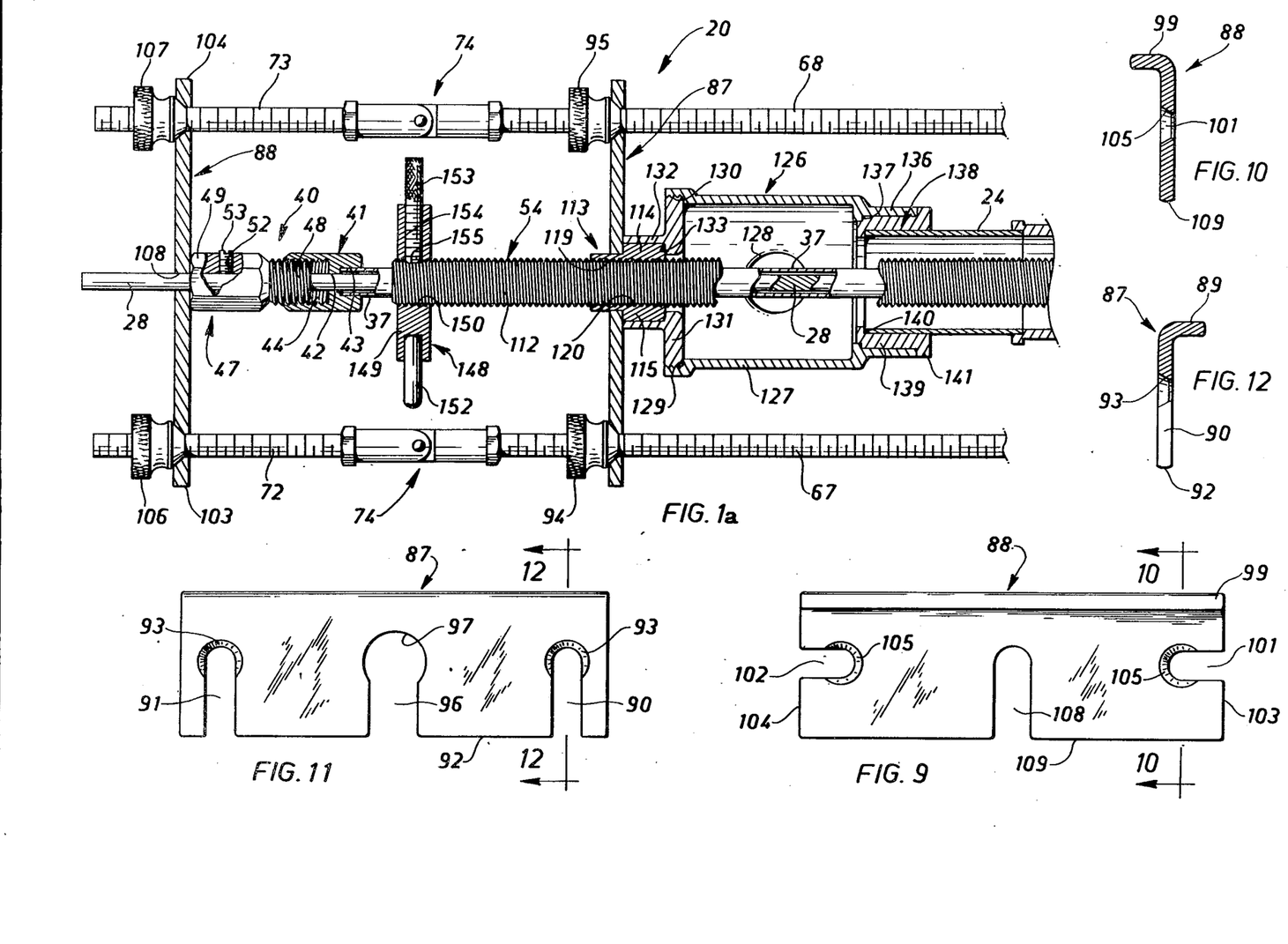
Figures 1B, 2, 13, 16:
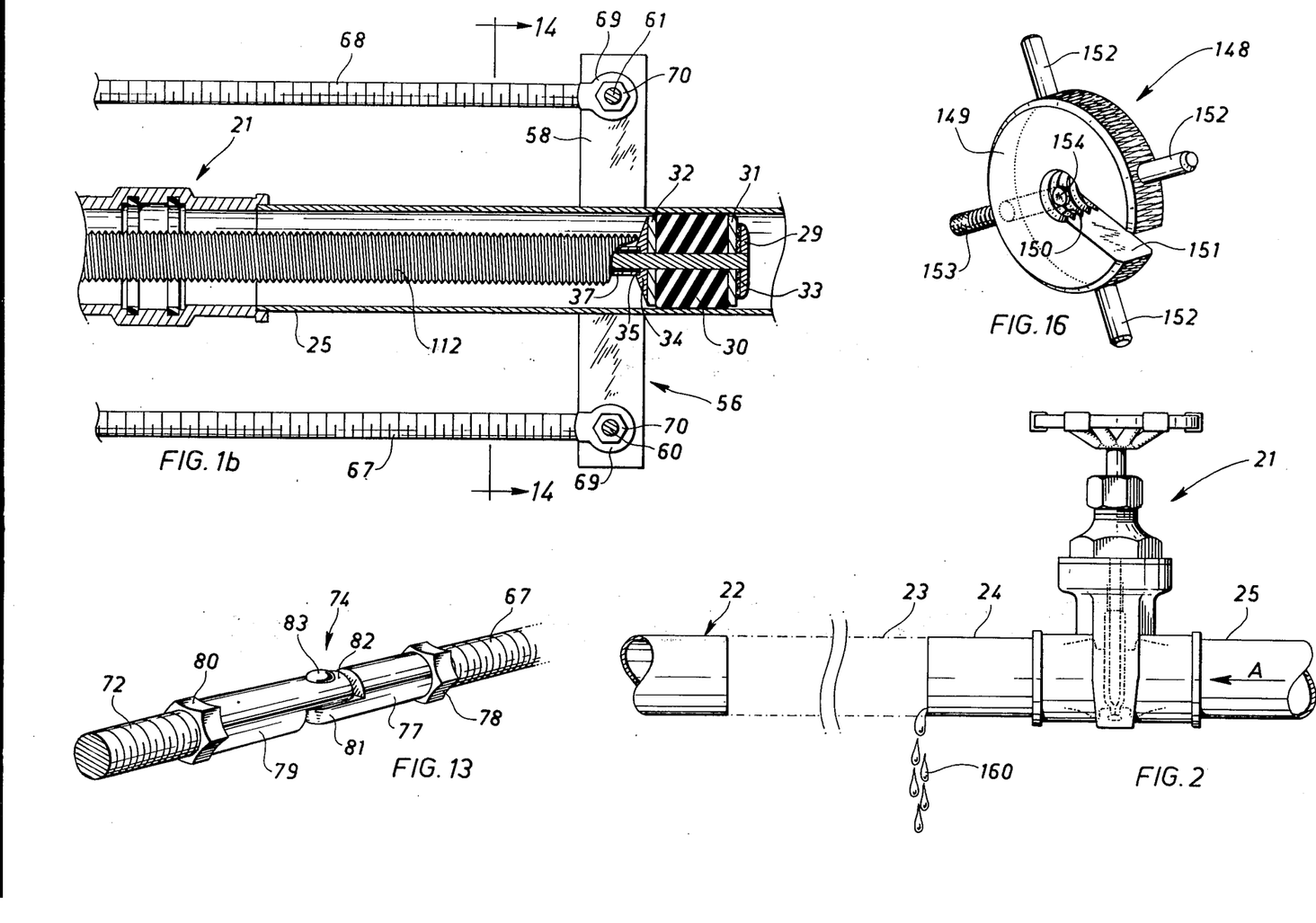

The embodiment of a plumbing device in accordance with this invention as indicated generally at 20 in the accompanying drawings is shown therein, merely by way of illustration, as being used in the replacement of a leaking gate valve generally indicated at 21 from a pipe generally indicated at 22 (FIG. 2). For convenience, it will be assumed that the gate valve 21 is mounted in the pipe 22 to allow the flow of water therein, as indicated by the arrow A (FIG. 2), to be halted as and when required. To replace the valve 21 using the device of this invention, a section of the pipe 22, as indicated fragmentarily and in phantom outline at 23 in FIG. 2, is first cut from the pipe 22. For a reason which will be more readily understood as the description herein proceeds, a short section of pipe 24 is left secured to the downstream side of the valve 21. The pipe section upstream of the valve 21 is indicated by the legend 25 while the pipe downstream of the cutaway section 23 is omitted from all the figures of the drawings except FIG. 2.

Referring now to the construction of the device 20, it will be seen that it includes an elongated and solid axial shaft 28 having, at its front or forward end, a radially outwardly extending flange 29 provided thereon, the flange 29 forming a sleeve-abutment member. A radially outwardly resiliently expansible and axially resiliently compressible rubber sealing sleeve or plug 30 is disposed on the shaft 28 rearwardly of the flange 29 while metal washers 31 and 32 are disposed on the shaft 28 forwardly and rearwardly respectively of the sealing sleeve 30, a fibre washer 33 being provided between the flange 29 and the washer 31. Rearwardly of the washer 32, there is provided on the axial shaft 28 a centering collar 34 which is formed in its rearwardly facing face with an axial recess 35 which together with the shaft 28 defines an annular pocket for receiving the forward end of an elongated cylinder 37 which is slidably disposed on the shaft 28.

In proximity to the rearward end of the axial shaft 28, there is mounted thereon a jack mechanism generally indicated at 40. The jack mechanism 40 comprises a first forwardly disposed jack member generally indicated at 41 and having a hexagonal sectional configuration 28. an axial bore 42 slidably receiving the shaft 228. At its forward end, the bore 42 opens into a larger diameter socket 43 which together with the shaft 28 defines an annular pocket for receiving the rearward end of the elongated cylinder 37. The first jack member 41 also comprises a rearwardly open and internally threaded skirt 44.

The jack mechanism 40 also comprises a second jack member generally indicated at 47 and including an externally threaded shank 48 and a hexagonal section body 49 having the same transverse dimensions as the first jack member 41, the male thread on the shank 48 co-acting the female thread in the skirt 44.

Two diametrically opposed threaded radial. Bores 52 are provided in the second or rearward jack member 47 to receive set screws 53 by means of which that second jack member 47 can be releasably secured in a desired position on the axial shaft 28.

It will now be understood that, by clamping the second or rearward jack member 47 in a desired position along the axial shaft 28 using the set screws 53, the expansible sealing plug 30 provided on the forward end of the axial shaft 28 can be expanded or released, as desired, simply by turning the first jack member 41, for example, with a first wrench, while holding the second jack member 47, for example, with a second wrench, to prevent rotation of the shaft 28.

The device 20 is usefully provided with interchangeable sealing sleeves or lugs 30 and washers 31 and 32 of several diameters to permit the device to be used in pipes with different internal diameters.

For convenience, the assembly already specifically described herein and including the axial shaft 28, the sealing sleeve or plug 30, the elongated cylinder 37 and the jacket mechanism 40 will be referred to hereinafter generally as the pipe-plugging tool assembly 54.

The plumbing device 20 also comprises a pipe-clamping shackle generally indicated at 56 and which can be secured in clamping engagement with the outer surface of the pipe section 25 as shown.

The pipe-clamping shackle 56 (FIG. 14) includes upper and lower clamping plates 57 and 58 respectively, each of which is formed with an arcuate centre portion 59 for engagement with the pipe section 25. Two threaded rods or clamping bolts 60 and 61 extend freely through holes 62 formed in the plates 57 and 58 near the ends of those plates and upper and lower clamping nuts 63 and 64 respectively are screwed onto the bolts 60 and 61 to allow the shackle 56 to be secured on the pipe section 35, as shown.

Figure 14:
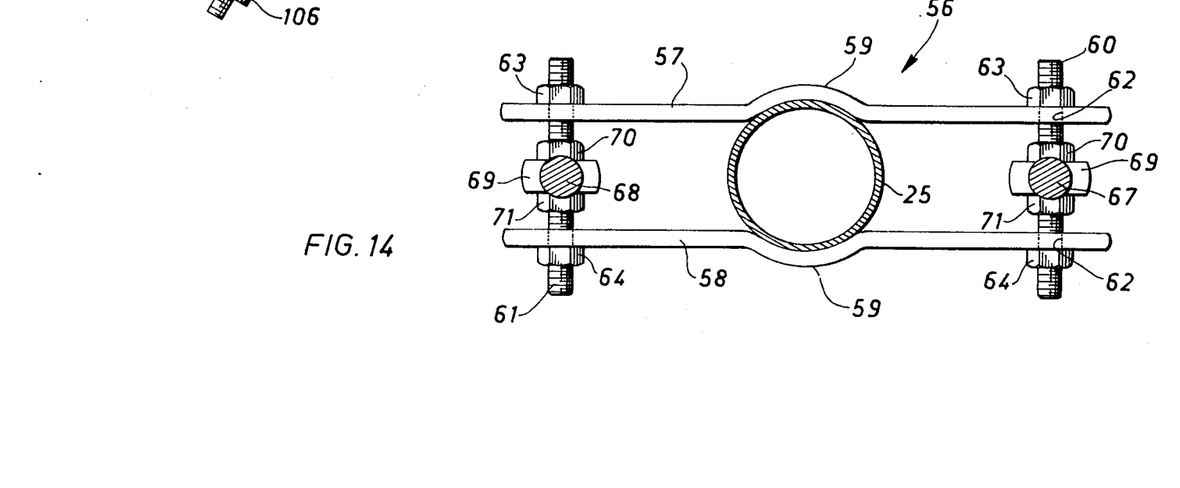
FIG. 14 is an enlarged rear elevation of a pipe-clamping shackle forming part of the device shown in FIGS. 1 to 8 when viewed as indicated by the arrows 14—14 of FIG. 1B and showing the pipe in section.

The device 20 is usefully provided with several sets of pipe-clamping plates 57, 58 having arcuate sections 59 formed with different radii of curvature to allow the device 20 to be used on pipes of different diameters.

Elongated threaded rods 67 and 68 provided at their forward ends with eyes 69 are pivotally and freely mounted in respective ones of the clamping bolts 60 and 61 between the upper and lower clamping plates 57 and 58 respectively so that those rods 67 and 68 can extend rearwardly from the pipe-clamping shackle 56. Nuts 70 an 71 are threaded on the clamping bolts 60 and 61 above and below the eyes 69 so as to allow the positions of the threaded rods 67 and 68 to be adjusted so that they are disposed in a common plane with the longitudinal axis of the pipe section 25 regardless of the diameter of that pipe section.

Figure 4:
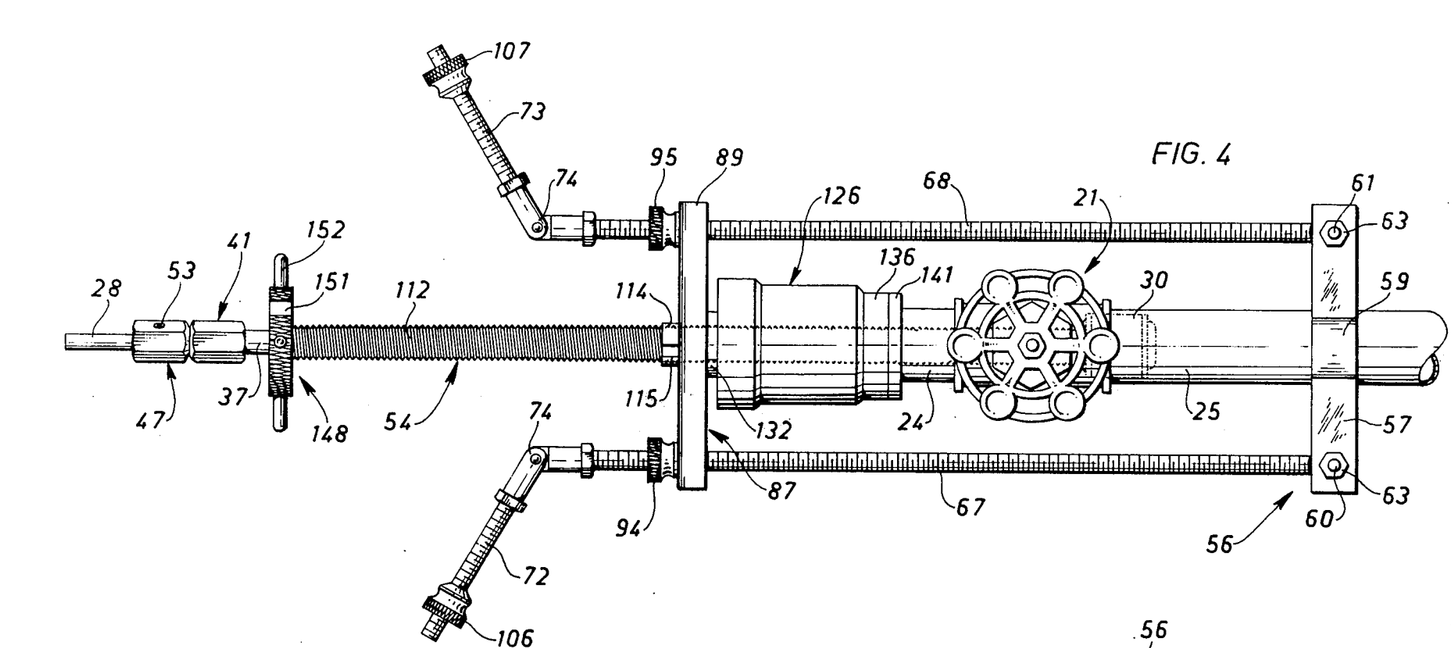
FIG. 4 is a plan view with certain parts shown in phantom outline and illustrating a further stage in which a sealing plug of the device is inserted into the pipe upstream of the gate valve.
Figure 7:
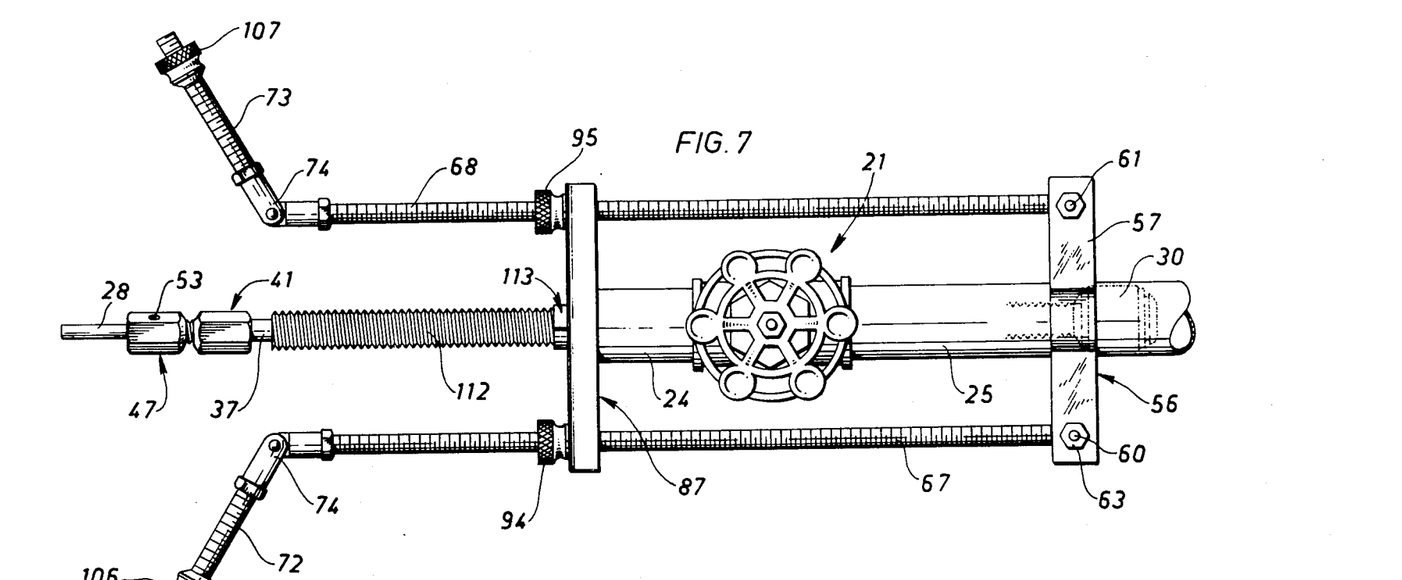
FIG. 7 is a plan view similar to that of FIG. 6 but illustrating a subsequent stage in the use of the device and, during which stage, the T-coupling is removed rearwardly from the device.
Figure 8:
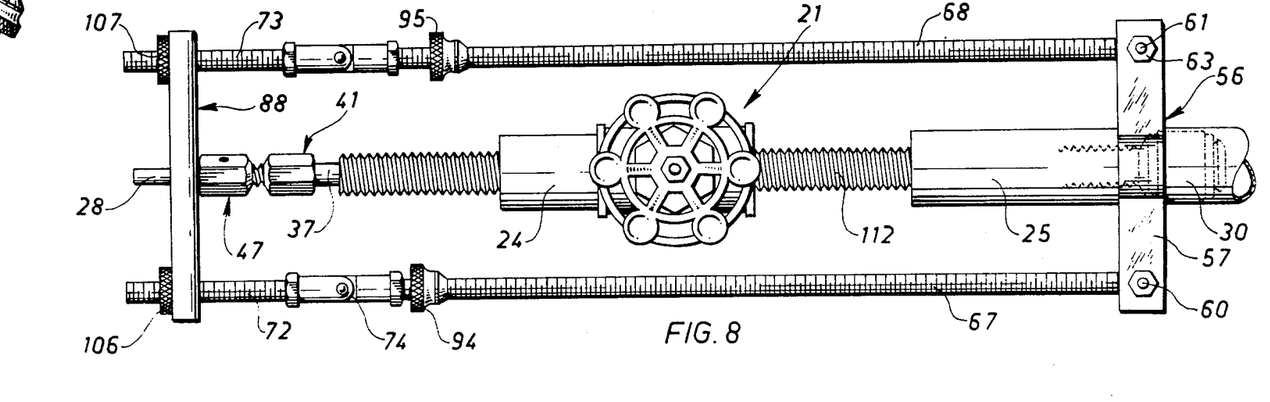
FIG. 8 is a plan view similar to that of FIG. 7 but illustrating a subsequent stage in the use of the device and, during which stage, the gate valve is released from its securement to the end of the pipe.

For a purpose yet to be explained and in accordance with an optional but not essential feature of this invention, each of the elongated threaded rods 67 and 68 is provided with a rearward portion 72, 73 respectively which is pivotally mounted as generally indicated at 74 on the forward portion of that rod so that those rearward portions 72 and 73 can be swung away from the axial shaft 28 as actually shown in FIGS. 4 and 7.

Further details of the pivotal mounting of the rearward portion 72 of the elongated threaded rod 67 on the forward portion of that rod 67 are shown in FIG. 13 from which it will be seen that the rearward end of the front portion of the rod 67 is screwed into an internally threaded sleeve 77 and secured in position therein by a lock nut 78. The rearward portion 72 is similarly screwed into an internally threaded sleeve 79 and secured in position therein by a lock nut 80. The sleeves 77 and 79 are formed with co-operating tongues 81 and 82 respectively which are pivoted together by a pivot pin 83.

Together the elongated threaded rods 67 and 68 including their rearward portions 72 and 73 respectively form a holding means extending rearwardly from the pipe-clamping shackle 56 for a purpose yet to be explained.

The device 20 also includes front and rear and generally rectangular lock gate plates 87 and 88 respectively which are shown in greater detail in FIGS. 9 to 12.

The front lock gate plate 87 is formed with a forwardly extending, handle-forming top edge flange 89 and with transversely spaced apart rod-receiving slots 90 and 91 extending upwardly into the plate from a bottom edge 92 thereof. The slots 90 and 91 are dimensioned to receive respective ones of the elongated threaded rods 67 and 68 and, in the rear face of the plate 87, the slots 90 and 91 are bevelled as indicated at 93 at their upper ends to provide seatings for knurled plate-holding nuts or stop members 94 and 95 screwed on respective ones of the rods 67 and 68.

The front lock gate plate 87 is also formed with a central open-ended slot 96 which extends upwardly from the bottom edge 92 and which is formed at its upper end with an enlarged circular opening 97, the centre of which is disposed on a line joining the centres of the rods 67 and 68 when the front lock gate plate 87 is secured in position on those rods 67 and 68 as shown in FIG. 1.

The rear lock gate plate 88 is formed with a rearwardly extending, handle-forming top edge flange 99 and with rod-receiving slots 101 and 102 extending transversely into that plate from respective ones of side edges 103 and 104 of that plate 88. At their inner ends, the slots 101 and 102 are bevelled as at 105 in the rear face of the plate to provide seatings for knurled plate-holding nuts or stop members 106 and 107 respectively which are screwed onto respective ones of the rear portions 72 and 73 of the elongated threaded rods 67 and 68 respectively.

The rear lock gate plate 88 is also formed with a generally central and open-ended slot 108 which extends upwardly into the plate from a bottom edge 109 thereof. The width of the slot 108 is such as to permit it to receive the rearward end of the axial shaft 28 but to abut the second jack member 47 while its height is such that, when the rear lock gate plate 88 is disposed on the rearward end of the axial shaft 28 and when the rearward portions 72 and 73 of the rods 67 and 68 respectively are received in respective ones of the slots 101 and 102, the centre of the axial shaft 28 is disposed on a line joining the centres of those rod portions 72 and 73 as will readily be understood by reference to FIG. 1.

The plumbing device 20 also comprises an externally thraded sleeve or bracing member 112 which is disposed freely about the elongated cylinder 37 so as to extend rearwardly from the centering collar 34 at the forward end of the axial shaft 28 to a position slightly forwardly of the first jack member 41. For convenience, the sleeve 112 will be considered herein as forming part of the pipe-plugging tool assembly 54.

Figures 3, 15:
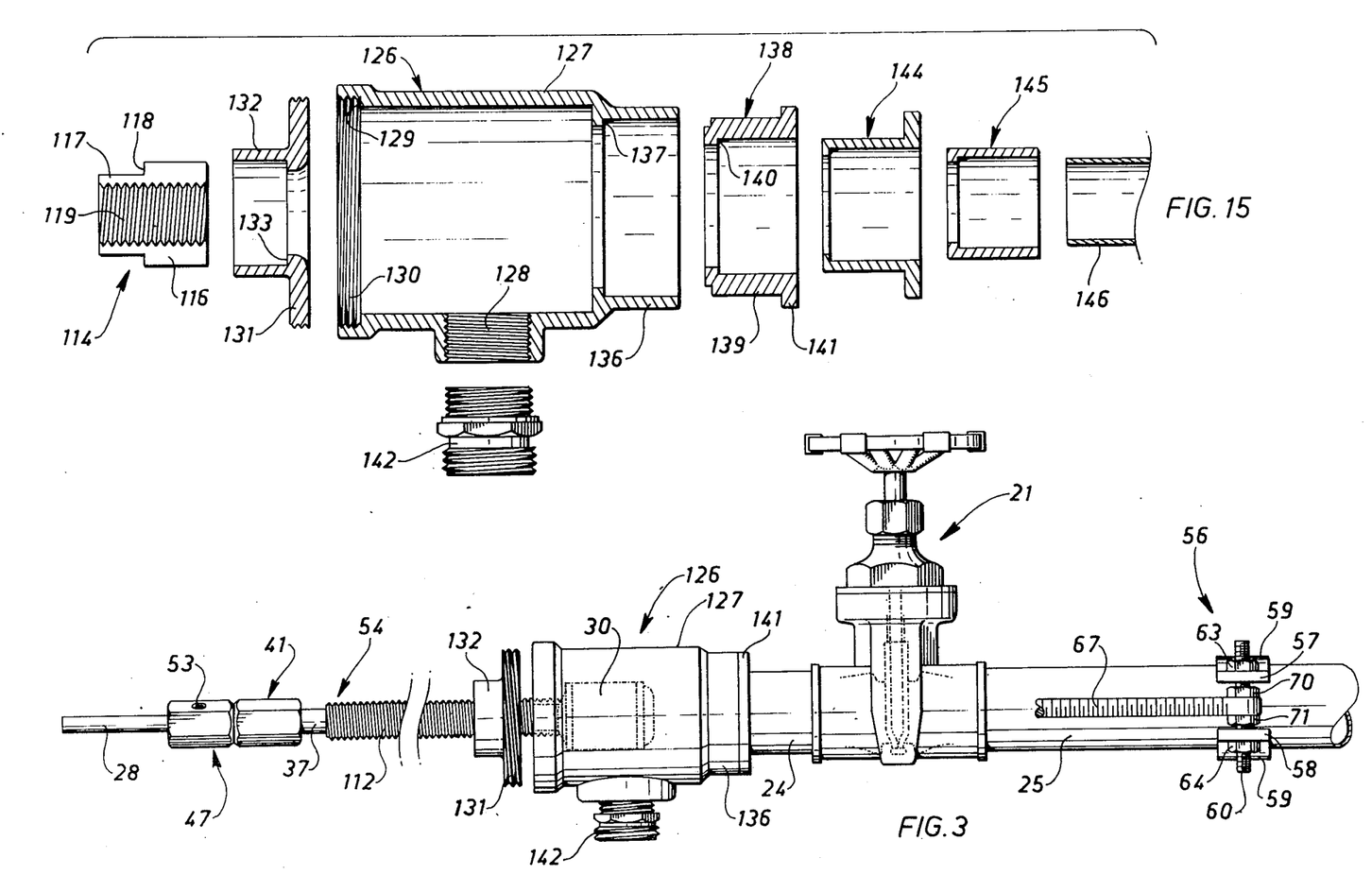
FIG. 3 is an elevational view of the pipe and valve shown in FIG. 2 again with certain parts shown in section and phantom outline and illustrating the first stage in the fitting of the device shown in FIG. 1 onto that pipe.
FIG. 15 is an enlarged side elevation of a split bushing and a T-coupling forming part of the device shown in FIGS. 1 to 8 with certain parts shown in section and additionally showing three adaptors by means of which the device can be used on pipes of different diameters.

A further component of the plumbing device 20 is a sleeve-gripping split bushing or abutment member generally indicated at 113. The split bushing 113 comprises mating half-bushings 114 and 115, one of which is shown in FIG. 15 and each of which includes a generally semi-cylindrical head 116 and a generally semi-cylindrical shank 117, an annular shoulder 118 extending between the head and shank of each of those half-bushings.

The assembled bushing 113 is formed with an internally threaded bore made up of semi-cylindrical and threaded half-bores 119 and 120 in each of the half-bushings 114 and 115 respectively. The bores 119 and 120 are dimensioned so that the half-bushings 114 and 115 can be disposed in mutual abutment about the aforementioned threaded sleeve 112 as particularly shown in FIGS. 1, 4 and 5. The central slot 96 in the front lock gate plate 87 is dimensioned freely to receive the threaded sleeve 112 while the circular opening 97 at the top end of that slot 96 is dimensioned to receive the shanks 117 of the assembled bushing 113 with the shoulders 118 thereof abutting the front face of the plate 87 as will best be understood by reference to FIG. 1.

Together the bushing 113 and the externally threaded sleeve 112 constitute a means for detachably coupling the front lock gate plate 87 to the sealing plug 30.

In accordance with a preferred but non-essential feature of this invention, the plumbing device 20 also comprises means for facilitating the introduction of the sealing sleeve 30 into a pipe. For this purpose, the device 20 includes a T-coupling generally indicated at 126 and in turn comprising a hollow body 127 formed with a drain opening 128.

At its rearward end, the body 127 of the T-coupling 126 is formed with a rearwardly facing internal annular shoulder 129 and with an internal thread 130 for threaded engagement with a corresponding externally threaded rear end wall 131. The end wall 131 is in turn integrally formed with a rearwardly extending skirt 132 dimensioned to receive the heads 116 of the half-bushings 114 and 115 when those half-bushings are disposed in mating engagement about the threaded sleeve 112, a rearwardly facing internal annular shoulder 133 being provided at the forward end of the skirt 132 for abutment by the heads 116 of the bushing 113.

At its front end, the body 127 of the T-coupling 126 is formed with a sleeve 16 terminating rearwardly in a forwardly facing internal annular shoulder 137. The T-coupling 126 is shown in FIGS. 1 to 6 as being used together with an adaptor 138 which is slidably received in the sleeve 136 and which includes a generally cylindrical body 139, an internal and forwardly facing annular shoulder 140 at its rearward end and an external annular lip 141 at its forward end, the lip 141 abutting the front edge of the sleeve 136 of the T-coupling 126 as best shown in FIG. 1.

The internal diameter of the adaptor 138 is such that it can be disposed about the end of the pipe section 24 with the rear edge of that pipe section seated on the aforementioned shoulder 140.

A hose coupling 142 is shown in FIGS. 3 and 15 as being screwed into the drain opening 128.

For use on a larger diameter pipe, the adaptor 138 is not used while additional nesting adaptors 144 and 145 are shown in FIG. 15 to allow the T-coupling 126 to be fitted on a smaller diameter pipe, for example, as indicated fragmentarily at 146, the adaptors being essentially indentical to the adaptor 138 but of smaller sizes.

Yet another component of the plumbing device 20 shown in the accompanying drawings is a sleeve-advancing drive wheel 148 (FIG. 16) comprising a discoid body 149, an internally threaded axial bore 150 and a radially extending slot 151. The diameter of the bore 150 corresponds to the external diameter of the threaded sleeve 112 while the slot 151 is wide enough to allow passage therethrough of the elongated cylinder 37 when the wheel 148 is screwed off the rearward end of the sleeve 112. The wheel 148 is shown as being provided with three radially extending handle pins 152 while a fourth pin 153 is screwed into a threaded bore 154 opening into the axial bore 150. The pin 153 acts as a set screw for securing the drive wheel 148 on the sleeve 112 for co-rotation therewith, the threads of the sleeve 112 being cut away as indicated at 155 (FIG. 1) to provide a seating for the inner end of the pin 153.

The manner in which the plumbing device 20 is used to facilitate the removal of a leaking gate valve 21 and the fittings of a replacement valve in the pipe 22 without requiring the water supply to be cut off upstream of the valve 21 will now be explained with particular reference to FIGS. 2 to 8 of the accompanying drawings.

As already explained, the section 23 of the pipe 22 is first cut away leaving a short section 24 of pipe projecting from the gate valve 21 as shown in FIG. 2. At such time, there will be a leakage of water from the pipe as indicted schematically at 160.

The pipe-clamping shackle 56 is then secured in position on the pipe section 25 upstream of the valve 21 by tightening the nuts 63 and 64 on the clamping bolts 60 and 61. The nuts 70 and 71 are then adjusted on the bolts 60 and 61 so that the threaded rods 67 and 68 are disposed essentially in a common plane containing the longitudinal axis of the pipe 22.

The T-coupling 126 with the rear end wall 131 unscrewed therefrom and with the adaptor 138 in position therein is next moved forwardly along the pipe-plugging tool assembly 54 until it is positioned on the exposed end of the pipe section 24 as shown in FIG. 3. Any water leaking through the valve 21 will now drain through the T-coupling 126 and out of the drain opening 128. If desired, a hose can be connected to the hose coupling 142 to drain away such water.

The pipe-plugging tool assembly 54 is then taken and, with the set screws 53 securing the second jack member 47 in position on the shaft 28, the first jack member 41 is rotated, if necessary, to allow the sealing sleeve 30 to return to its essentially non-expanded form as shown in FIG. 3.

The front end of the pipe-plugging tool assembly carrying the sealing sleeve 30 is next introduced into the open rear end of the T-coupling 126 as shown in FIG. 3. The rear end wall 131 of the T-coupling 126 is now placed over the rear end of the pipe-plugging tool assembly 54, then moved forwardly along the threaded sleeve 112 and screwed into the rear end of the T-coupling 126 until it abuts the internal shoulder 129 therein (FIG. 15). At this time, any water leaking through the valve 21 passes around the sealing sleeve 30 within the T-connector 126 and drains through the drain opening 128. The half-busings 114 and 115 are next placed around the threaded sleeve 112 slightly rearwardly of the skirt 132 of the rear end wall 131 of the T-coupling 126 with their heads disposed forwardly and jointly screwed forwardly along the threaded sleeve 112 until they are received within that skirt 132 and until they abut the rearwardly facing shoulder 133 therewithin.

The front lock gate plate 87 is now taken and placed over the threaded rods 67 and 68 and over the threaded sleeve 112 a short distance rearwardly of the bushing 113 but forwwardly of the knurled plate-holding nuts 94 and 95, the rods 67 and 68 being received in respective ones of the slots 90 and 91 and the threaded sleeve 112 being received in the slot 96. The plate 87 is next moved forwardly until the shanks 117 of the half-bushings 114 and 115 are disposed in the circular opening 97 at the top of the slot 96 in the plate 87 so that the shoulders 118 of those half-bushings abut the front face of the plate 87.

The plate-holding nuts 94 and 95 are next screwed forwardly along the rods 67 and 68 respectively until they are seated in the bevelled upper parts of the slots 90 and 91 respectively. In this way, the bushing 113 with the threaded sleeve 112 extending therethrough is clamped in a fixed axial position relative to the pipe section 25.

The sleeve-advancing drive wheel 148 (FIG. 16) is now taken and placed on the elongated cylinder 37 rearwardly of the threaded sleeve 112 but forwardly of the first jack member 41. During this operation, the cylinder 37 passes through the radial slot 151 in that wheel 148. During this operation, it is sometimes necessary to pull the axial shaft 28 and the elongated cylinder 37 thereon by hand slightly rearwardly relative to the threaded sleeve 112 to provide sufficient space between the rear end of the sleeve 112 and the first jack member 41 to allow the wheel 148 to be positioned on the cylinder 37 in the manner described.

The wheel 148 is now screwed onto the rear end of the threaded sleeve 112 until the locking pin 153 is axially and radially aligned with the seating 155 on the sleeve 112. The pin 153 is then tightened so that the wheel 148 can be used to rotate the sleeve 112. During such rotation of the sleeve 112 by the wheel 148, that sleeve is advanced in a forward direction through the fixed bushing 113 and abutment of that sleeve 112 with the centering collar 34 causes bodily forward advancement of the pipe-plugging tool assembly 54. Rotation of the wheel 148 is continued until the sealing sleeve 30 starts to enter the body of the valve 21. To permit further forward advance movement of the sealing sleeve 30, it is, at this time, necessary to open the valve 21. Further rotation of the drive wheel 148 then causes the sealing sleeve 30 to pass through the valve 21 into the pipe section 25 as shown in FIG. 4. It is to be noted at this stage that the sealing sleeve is still not expanded but is being moved against the water pressure in the pipe section 25. Rotation of the wheel 148 is continued until the second jack member 47 of the jack mechanism 40 is disposed slightly forwardly of the rear ends of the rearward portions 72 and 73 of the threaded rods 67 and 68 respectively. In accordance with an optional feature of this invention, handling of the wheel 148 during this seal-inserting stage is facilitated by swinging those arm portions 72 and 73 outwardly away from the pipe-plugging tool assembly 54 as shown in FIG. 4.

Introduction of the pipe-plugging tool assembly 54 into the pipe 22 in the manner hereinbefore specifically described is not an essential feature of this invention and will not, in fact, be required when the water pressure in the pipe section 25 is relatively small, it then being possible to insert the assembly by hand. The tool-inserting assembly described does, however, have the practical advantage that, in its use, no strain is applied to the pipe section 25 or to its mounting as might well be the case with manual insertion.

With the pipe-plugging tool assembly 54 inserted in the pipe, the rear lock gate plate 88 is next placed over the axial shaft 28 rearwardly of the jack mechanism 40 and the rearward rod portions 72 and 73 are swung inwardly so as to be received in respective ones of the slots 101 and 102 in the plate 88 with the knurled plate-holding nuts 106 and 107 disposed rearwardly of that plate 88.

Figure 5:
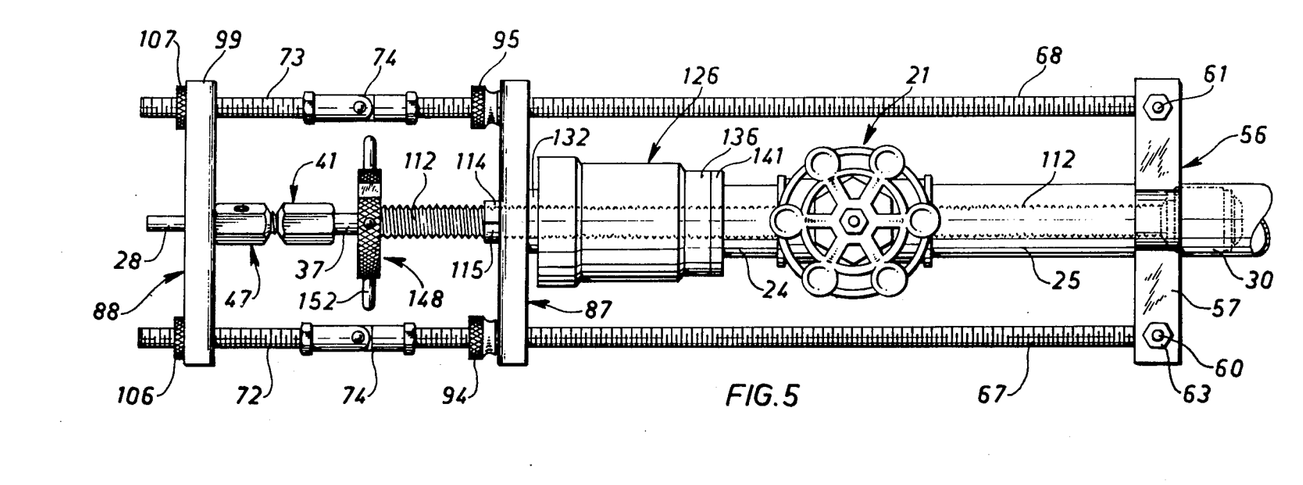
FIG. 5 is a plan view similar to that of FIG. 4 and showing a subsequent stage in the use of the device of FIG. 1 and, at which stage, the sealing plug is in the stage of being expanded into sealing engagement with the inner surface of the pipe.

Holding the second or rear jack member 47 against rotation with a first wrench, the first or front jack member 41 is then turned with a second wrench to cause axial separation of those jack members and consequently axial compression and radially outward expansion of the sealing sleeve 30 into sealing engagement with the inner surface of the pipe section 25 as shown in FIG. 5 and so in turn to prevent any further passage of water from that pipe section. During this expansion of the sealing sleeve 30, the axial shaft 28 as well as the elongated cylinder 37 thereon will slide a short distance rearwardly through the threaded sleeve 112 under the action of the water pressure in the pipe section 25 to maintain that sleeve 112 in abutment with the centering collar 34.

The knurled plate-holding nuts 106 and 107 are then screwed forwardly along the rear rod portions 72 and 73 respectively until they are seated in the bevelled inner ends 105 of the slots 101 and 102 respectively in the rear plate 88 with the front surface of that plate abutting the second jack member 47 as shown in FIG. 5.

The sealing sleeve 30 is now held firmly in position in the pipe section 25 against displacement therein under the action of the water pressure by virtue of the fact that the sleeve 30 is effectively coupled to the pipe-clamping shackle 56 through the rear lock gate plate 88.

The sleeve-advancing drive wheel 148 is next released from the threaded sleeve 112 by unscrewing the pin 153 and turning the wheel 148 in the opposite direction until it leaves the rear end of the sleeve 112 and can be removed from the short exposed length of the elongated cylinder 37 between the rear end of the sleeve 112 and the front jack member 41.

Figure 6:
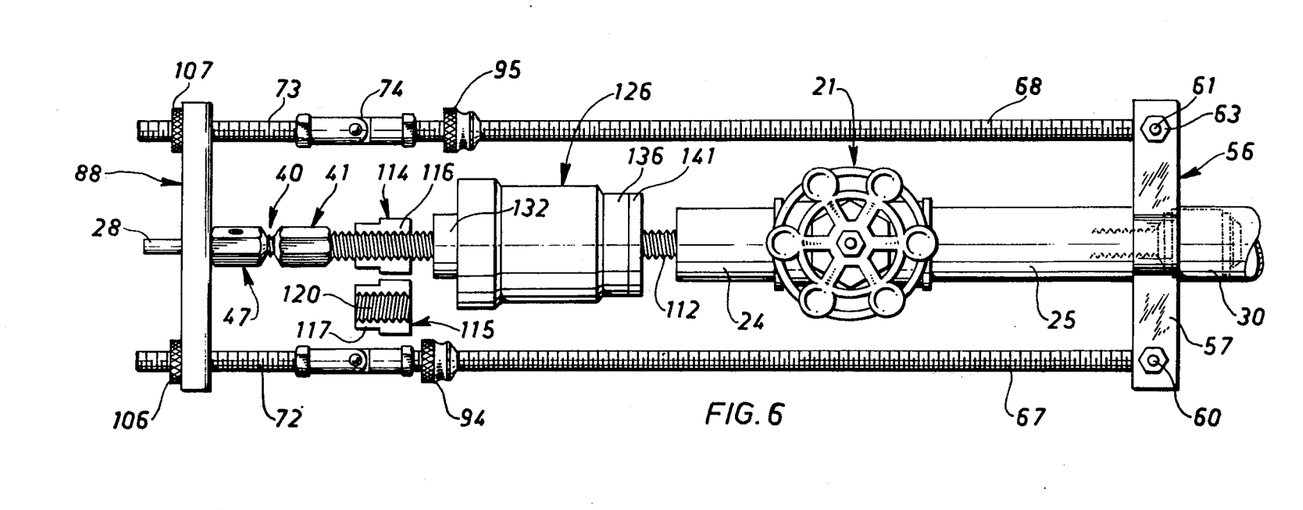
FIG. 6 is a plan view similar to that of FIG. 5 but illustrating a subsequent stage in the use of the device and, during which stage, a T-coupling forming part of the device, is released from its engagement with the end of the pipe.

With the sealing sleeve 30 held in position in the pipe section 25 by the rear lock gate plate 88, the front lock gate plate 87 is removed by unscrewing the plate-holding nuts 94 and 95 to allow the front plate 87 to be moved rearwardly off the shanks 117 of the half-bushings 114 and 115 and then lifting of that plate 87 off the threaded sleeve 112 and the threaded rods 67 and 68. The threaded sleeve 112 can now be slid rearwardly a short distance along the elongated cylinder 37 until the rear end of that sleeve 112 abuts the front jack member 41; the bushing 113 is then unscrewed until it leaves the skirt 132 of the T-coupling 126 and can then be removed from that sleeve 112 (FIG. 6). The T-coupling 126 is now moved rearwardly until it reaches the jack mechanism 40.

To permit removal of the T-coupling 126 from the device 20, it is first necessary to transfer the securement of the sealing device sleeve 30 from the rear lock gate plate 88 to the front lock gate plate 87. For this purpose, the split bushings 114 and 115 are again placed in position around the threaded sleeve 112 but this time forwardly of the T-coupling 126. The front lock gate plate 87 is now again placed in position on the threaded sleeve 112 and on the threaded rods 67 and 68 so that the shanks 117 of the half-bushings 114 and 115 are received in the circular opening 97 in that plate 87. The plate-holding nuts 94 and 95 are now tightened against the plate 87 in the manner already described. The sealing sleeve 30 is now axially secured through the front lock gate plate 87 and the rear lock gate plate 88 can consequently be removed by unscrewing the nuts 106 and 107 so in turn to allow the T-coupling 126 to be removed from the rearward end of the pipe-plugging tool assembly 54 (FIG. 7).

The rear lock gate plate 88 is now replaced on the axial shaft 28 and on the rearward rod portions 72 and 73 and the nuts 106 and 107 are again tightened until that plate 88 abuts the second jack member 47. The front lock gate plate 87 and the bushing 113 are now removed in the manner already described and the gate valve 21 carrying the short pipe section 24 is then released from the upstream pipe section 25 for example by means of a blow torch. With the gate valve 21 released from the pipe section 25, that valve can be moved rearwardly along the threaded sleeve 112 (FIG. 8) until it is disposed sufficiently rearwardly that the front lock gate plate 87 can once again be secured in position about the bushing 113. Then, by removing the rear lock gate plate 88, the valve 21 can be completely removed.

Having removed the faulty valve 21, a replacement valve is passed forwardly along the sleeve 112 until it is disposed sufficiently forwardly once again to allow the rear lock gate plate 88 to be used to provide the clamping function. With the rear lock gate plate 88 in position, the front lock gate plate 87 is again removed to allow the replacement valve to be positioned on the end of the pipe section 25 and to be secured thereto, for example, by soldering. The device 20 is then removed from the pipe 25 and the valve replacement task is complete.

Although the invention has been described with reference to the particular plumbing device 20 shown in the accompanying drawings and with reference to the use of that device for replacing a faulty gate valve in a pipe, it should be understood that numerous modifications in both the construction and manner of use of a device in accordance with this invention are possible.

What is claimed is:

1. A plumbing device which comprises:
   an elongated axial shaft having front and rear ends;
   a radially outwardly resiliently expansible and axially resiliently compressible sealing plug disposed about said shaft in proximity to said front end thereof, said sealing plug being intended to be disposed within a pipe for sealing engagement with an inner surface of such a pipe;
   a plug-abutment member on said axial shaft for axial abutment by said sealing plug forwardly thereof;
   a jack mechanism comprising first and second jack members adapted to undergo relative axial separation on relative rotation thereof in a first direction and relative axial movement toward each other on relative rotation in the opposite direction, and disposed on said shaft toward said rear end thereof;
   an elongated cylinder surrounding said shaft and extending between said sealing plug and said jack mechanism and adapted to transmit axial movement from said jack mechanism to said sealing plug to cause axial compression and consequently radially outward expansion of said sealing plug on relative rotation of said first and second jack members in said first direction;
   a pipe-clamping shackle for clamping engagement with an outer-surface of the pipe;
   a holding means extending rearwardly from said pipe-clamping shackle;
   a rear lock gate plate having a front face, including an open-ended slot, couplable to aid holding means and adapted removably and freely to receive said elongated shaft rearwardly of said jack mechanism in said slot for axial abutment of said jack mechanism against said front face thereby to maintain said sealing plug in a desired axial position within the pipe when said rear lock gate plate is so positioned on said axial shaft, when said rear lock gate plate is coupled to said holding means and when said shackle is secured in clamping engagement with the pipe;
   a front lock gate plate having a front face, including an open-ended slot, couplable to said holding means, and adapted removably to receive said elongated cylinder in said slot therein;
   an abutment member adapted to be received in said open-ended slot in said front lock gate plate for axial abutment with said front face of said front lock gate plate; and
   a rigid bracing member extending between said abutment member and said sealing plug to maintain said sealing plug in a desired axial position within the pipe when said abutment member is so disposed in said slot in said front lock gate plate, when said front lock gate plate is coupled to said holding means, and when said shackle is secured in clamping engagement with the pipe,
   whereby said sealing plug can be held in such a desired axial position within the pipe by either of said front and rear lock gate plates thereby to permit both the removal from and the fitting to the end of the pipe of a plumbing element without risk of axial movement of said sealing plug.

2. A plumbing device as claimed in claim 1, in which said bracking member comprises an elongated sleeve freely disposed about said elongated cylinder for axial movement therealong, said elongated sleeve being detachably coupable to said abutment member.

3. A plumbing device as claimed in claim 2, in which aid elongated sleeve is externally threaded, and in which said abutment member comprises an internally threaded sleeve-gripping bushing dimensioned for disposition within said slot in said front lock gate plate, in axial abutment with said front face of that plate and in threaded engagement with said elongated sleeve, whereby, on relative rotation of said elongated sleeve and said bushing with said bushing in axial abutment with said front face of said front lock gate plate, said elongated sleeve is caused to undergo axial movement relative to said front lock gate plate.

4. A plumbing device as claimed in claim 3 and in which said sleeve-gripping bushing is in the form of a split bushing comprising two essentially identical and separable parts.

5. A plumbing device as claimed in claim 4 and which additionally comprises a plug-advancing drive member secured to said elongated sleeve rearwardly of said front lock gate plate for co-rotation with said elongated sleeve.

6. A plumbing device as claimed in claim 5 and in which said plug-advancing drive member is releasably and removably secured to said elongated sleeve.

7. A plumbing device as claimed in claim 6 and in which said plug-advancing drive member is formed with a generally central and internally threaded bore for threaded engagement with said elongated sleeve and with a sleeve-clamping member generally radially and movably mounted in said plug-advancing drive member.

8. A plumbing device as claimed in claim 7 and in which said plug-advancing drive member is formed with a radially extending slot opening into said generally central bore therethrough, said slot being dimensioned to allow said plug-advancing drive member to be removed radially from said elongated cylinder after being unscrewed from the rearward end of said elongated sleeve.

9. A plumbing device as claimed in claim 1 and in which said holding means comprises a pair of mutually spaced apart and elongated rods terminally coupled to said pipe-clamping shackle and extending rearwardly therefrom.

10. A plumbing device as claimed in claim 9, in which each of said front and rear lock gate plates is formed with first and second rod-receiving slots for receiving respective ones of said elongated rods of said holding means, and which device additionally comprises stop members on said elongated rods for abutment by respective ones of said front and rear lock gate plates to limit rearward movement of said plates when said plates are disposed with said rods received in respective ones of said first and second rod-receiving slots thereof.

11. A plumbing device as claimed in claim 10, in which each said elongated rod is threaded and in which each said stop member comprises a nut threaded onto a respective one of said elongated rods.

12. A plumbing device as claimed in claim 11 and in which each said elongated rod is pivotally mounted on said pipe-clamping shackle.

13. A plumbing device as claimed in claim 11 and in which said elongated rods are mounted on said pipe-clamping shackle so as to be disposed essentially in a common plane with the longitudinal axis of a pipe when the pipe-clamping shackle is secured in clamping engagement on such a pipe.

14. A plumbing device as claimed in claim 13 and in which each said elongated rod is adjustably mounted on said pipe-clamping shackle so as to be disposable in a common plane with the longitudinal axis of a pipe when said pipe-clamping shackle is secured in clamping engagement on pipes of different diameters.

15. A plumbing device as claimed in claim 14, in which each said elongated rod is pivotally mounted on said pipe-clamping shackle, and in which rearward end portions of said threaded rods are pivotally mounted on forward portions thereof, whereby said rearward end portions of said threaded rods can be swung away from said axial shaft when said front lock gate plate is secured on said threaded rods and said rear lock gate plate is detached therefrom.

16. A plumbing device as claimed in claim 11, in which said bracing member comprises an elongated and externally threaded sleeve freely disposed about said elongated cylinder for axial movement therealong, and in which said abutment member comprises an internally threaded, sleeve-gripping separate bushing in turn comprising two essentially identical and separable parts and dimensioned for disposition within said open-ended slot in said front lock gate plate, in axial abutment with said front face of that plate and in threaded engagement with said elongated sleeve, whereby, on relative rotation of said elongated sleeve and said bushing with said bushing in such axial abutment with said front face of said front lock gate plate said elongated sleeve is caused to undergo axial movement relative to said front lock gate plate.

17. A plumbing device as claimed in claim 4 and which additionally comprises a hollow pipe coupling for disposition about said elongated sleeve, said hollow pipe coupling having a forward end dimensioned to receive and to provide a seating for the end of the pipe, and a rearward end including a bore for receiving said sleeve-gripping bushing with said two parts thereof in mating engagement with each other, and a seating being provided in said pipe coupling for limiting forward axial movement of said sleeve-gripping bushing relative to said pipe coupling.

18. A plumbing device as claimed in claim 17 and in which said pipe-coupling comprises a drain opening for the drainage of fluid therefrom.

19. A plumbing device as claimed in claim 18 and in which said drain opening in said pipe-coupling is provided with a drain hose-attachment fitting.

20. A plumbing device as claimed in claim 17 and in which said pipe coupling comprises a plurality of similar generally cylindrical adaptors for nested disposition in said forward end of said coupling, each said adaptor being adapted to receive therein a pipe of a corresponding predetermined diameter and having a seating for the end of a pipe of such a predetermined diameter.

21. A plumbing device as claimed in claim 17, in which said holding means comprises a pair of mutually spaced apart, threaded and elongated rods terminally coupled to said pipe-clamping shackle and extending rearwardly therefrom and having nuts threaded thereon, and in which each of said front and rear lock gate plates is formed with first and second rod-receiving slots for receiving respective ones of said elongated rods so that abutment of said lock gate plates with respective ones of said nuts threaded on said rods is effective to limit rearward movement of those lock gate plates when said rods are so disposed in said rod-receiving slots in said plates.

22. A plumbing device as claimed in claim 1 and in which said jack mechanism comprises: a said first jack member slidably disposed on said axial shaft toward said rearward end thereof and including an internally threaded skirt defining with said shaft an annular socket; a said second jack member slidably disposed on said shaft toward said second end thereof and including an externally threaded shank received within said annular socket of said first jack member for coaction therewith, whereby, on relative rotation of said first and second jack members, those members are caused to undergo relative axial movement so in turn to cause axial movement of said elongated cylinder.

23. A plumbing device as claimed in claim 22, in which said bracing member comprises an elongated and externally threaded sleeve freely disposed about said elongated cylinder for axial movement therealong, and in which said abutment member comprises an internally threaded, sleeve-gripping split bushing in turn comprising two essentially identical and separable parts and dimensioned for disposition within said open-ended slot in said front lock gate plate, in axial abutment with said front face of that plate and in threaded engagement with said elongated sleeve, whereby, on relative rotation of said elongated sleeve and said bushing with that bushing in axial abutment with said front face of said front lock gate plate, said elongated sleeve is caused to undergo axial movement relative to said front lock gate plate.

24. A plumbing device as claimed in claim 23 and which additionally comprises a hollow pipe coupling for disposition about said elongated sleeve, said coupling having a forward end dimensioned to receive and to provide a seating for the end of the pipe, and a rearward end including a bore for receiving said sleeve-gripping bushing with said two parts thereof in mating engagement with each other, and a seating being provided in said pipe coupling for limiting forward axial movement of said sleeve-gripping bushing relative to said pipe coupling.

25. A plumbing device as claimed in claim 24 and in which said pipe coupling comprises a plurality of similar generally cylindrical adaptors for nested disposition in said forward end of said coupling, each said adaptor being adapted to receive therein a pipe of a corresponding predetermined diameter and having a seating for the end of a pipe of such a predetermined diameter.

* * * * *